United States Patent [19]

Otto et al.

[11] 4,306,844
[45] Dec. 22, 1981

[54] VEHICLE FUEL TANK WITH INTERNAL FUEL PUMP

[75] Inventors: Heinz Otto, Wolfsburg; Helmut Hoppmann, Braunschweig, both of Fed. Rep. of Germany

[73] Assignee: Volkswagenwerk Aktiengesellschaft, Fed. Rep. of Germany

[21] Appl. No.: 151,879

[22] Filed: May 12, 1980

Related U.S. Application Data

[63] Continuation of Ser. No. 909,700, May 25, 1978, abandoned.

[30] Foreign Application Priority Data

May 26, 1977 [DE] Fed. Rep. of Germany ....... 2723771

[51] Int. Cl.³ .......................................... F04B 35/04
[52] U.S. Cl. ................................... 417/424; 137/565
[58] Field of Search ................ 417/424; 137/565, 576

[56] References Cited

U.S. PATENT DOCUMENTS

| | | | |
|---|---|---|---|
| 3,168,868 | 2/1965 | Schultz | 417/424 |
| 3,659,965 | 5/1972 | Ebert et al. | 417/424 X |
| 3,726,310 | 4/1973 | Coscia | 137/576 |
| 3,871,796 | 3/1975 | Mack | 417/424 X |
| 3,910,464 | 10/1975 | Schlonzky | 137/565 X |

FOREIGN PATENT DOCUMENTS 1155337  10/1963  Fed. Rep. of Germany ...... 417/424

*Primary Examiner*—William R. Cline
*Attorney, Agent, or Firm*—Brumbaugh, Graves, Donohue & Raymond

[57] ABSTRACT

A vehicle fuel tank is provided with a pump mounted to the bottom of the tank. The outlet line leads from the pump in a curved path to a cover on the top wall of the tank. This arrangement facilitates assembly of the tank without difficulty relating to connection of the outlet line on account of variations in overall tank dimensions.

6 Claims, 1 Drawing Figure

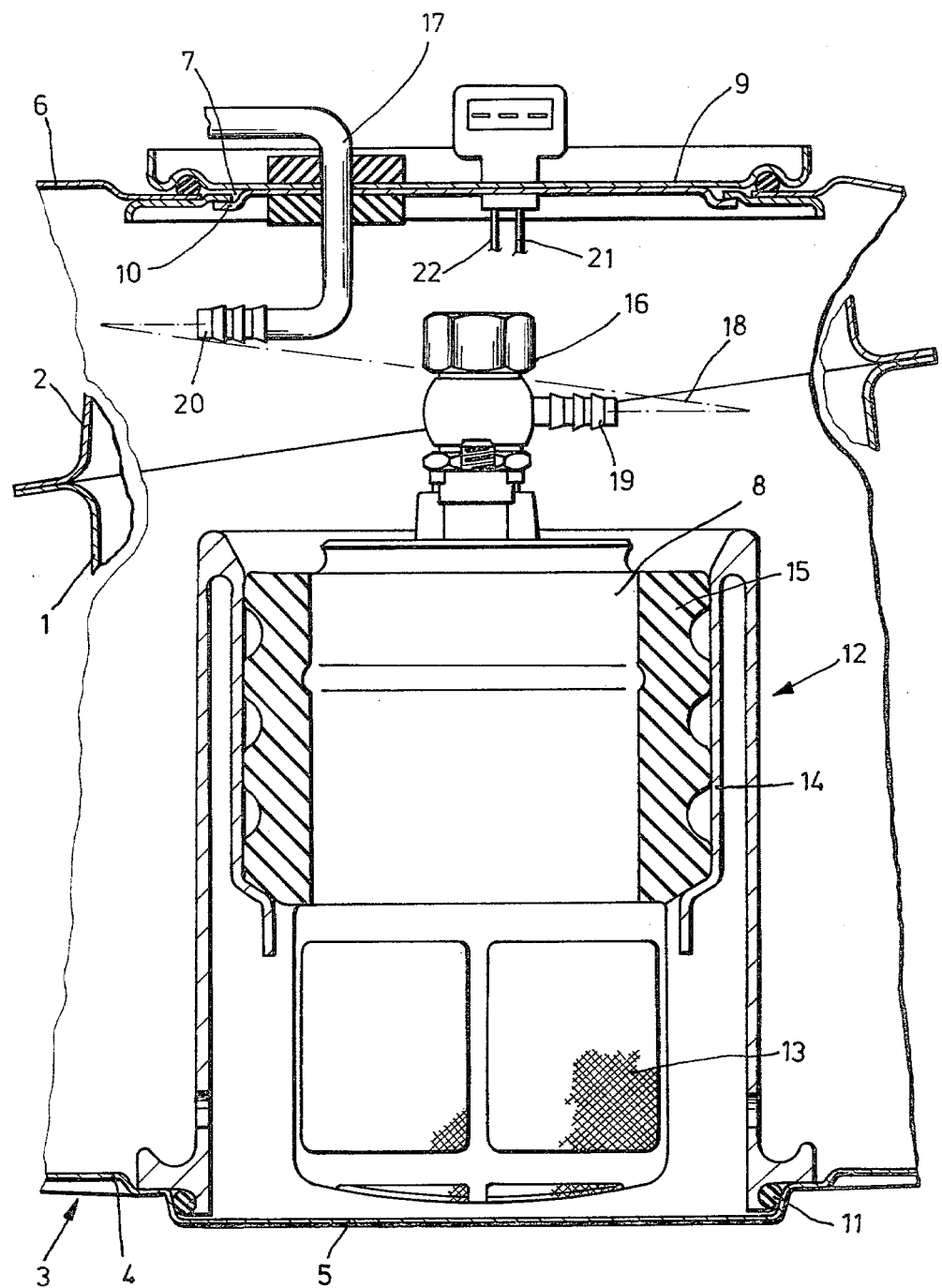

VEHICLE FUEL TANK WITH INTERNAL FUEL PUMP

This is a continuation of application Ser. No. 909,700, filed May 25, 1978, now abandoned.

BACKGROUND OF THE INVENTION

This invention relates to fuel tanks, and particularly to fuel tanks with internal fuel pumps.

Prior techniques for mounting fuel pumps within a vehicle fuel tank include the use of a freely floating pump which is mounted by a bracket to the top wall of the fuel tank as shown in U.S. Pat. No. 3,101,771. Thus, the top wall of the tank can be assembled with the fuel pump and mounting brackets and thereafter assembled with the bottom portion of the tank by use of screws. The free-floating fuel pump tends to oscillate, particularly when the tank has a low fluid level, and can thereby generate undesired noises. In addition, the distance between the intake opening of the pump and the bottom of the tank, which determines whether full utilization is made of tank capacity, depends upon a large number of tolerances, so that it is possible that part of the tank content cannot be used in order to prevent interference of parts. In order to achieve full utilization of the tank and make the distance between the suction opening of the pump and the tank bottom very small using prior arrangements, it would be necessary to construct all elements of the fuel tank with very tight tolerances.

German patent disclosures Nos. 2,440,904 and 2,505,740 show tank arrangements wherein a fuel pump is secured using an elastic intermediate layer in a recess in the tank bottom, and provide with an outlet line that runs from the fuel pump in the form of a rigid pipe to a cover which is connected on the upper tank wall. While this arrangement provides a fixed position for the pump, which enables full utilization of the tank contents, it is necessary to maintain tolerances between the cover position and the tank bottom in order that the parts can be assembled together in the proper configuration. In particular, even a very small change in the height of the tank will require a different length of rigid fuel outlet pipe. Further it should be noted that when the lid is fastened to the top wall of the tank, movements will occur which will be opposed by the pump and its bracing to the tank bottom. The use of a relatively simple one turn cap for a cover is not possible with the arrangement shown by the prior publication.

It is therefore an object of the present invention to provide a new and improved fuel tank which includes a fuel pump, and is capable of easy assembly without the requirement for close tolerances among the various parts of the fuel pump and tank.

It is a further object of the invention to provide such an arrangement wherein noises associated with the operation of the fuel pump are not easily conveyed to the outside of the tank.

It is a still further object of the invention to provide such an arrangement which can be easily implemented in tanks of various sizes.

SUMMARY OF THE INVENTION

In accordance with the invention there is provided a vehicle fuel tank which includes a tank enclosure having a bottom wall, a top wall, an opening on the top wall and a cover for closing the opening. A fuel pump is mounted with a noise dampening intermediate layer to the bottom wall. A flexible fuel outlet line extends in a curved path between the fuel pump and the cover.

In a preferred embodiment, the cover and the fuel pump are provided with fuel line connections arranged to receive a horizontal fuel line. The curved path comprises an approximately helical arc between the connections when viewed from the direction of the top wall. The fuel pump may be mounted by the use of a noise dampening intermediate member within a reserve tank, and the reserve tank mounted to the bottom wall of the tank enclosure. There may be provided electrical connection lines for the fuel pump which also extend in a curved path between the cover and the pump.

One of the characteristics of the invention is avoiding the use of the lid or top wall of the fuel tank for mounting of the fuel pump. The pump is secured only to the bottom wall of the tank or mounted to the side wall adjacent the bottom wall. Where the tank is fabricated out of two half shells, the fuel pump is mounted to the bottom half shell.

Another characteristic of the invention is selection of a flexible fuel outlet line of sufficient length to extend between the cover and the pump so that relative movements between the pump and the cover become possible. By overdimensioning the length of the outlet line, where it extends between the pump and cover, compensations may be achieved for different heights of fuel tank on one hand, and the transmission of noises generated by the pump can be avoided on the other hand. Overdimensioning of the outlet line also facilitates rotating movements of the cover relative to the top wall of the tank so that the cover may be fastened onto the tank by use of a one-turn closing or screw movement. Where a reserve tank is provided surrounding the fuel pump, to assure that fuel is is in the vicinity of the pump intake even when the vehicle travels around corners or curves, the pump itself can be mounted within the reserve tank which is then mounted to the bottom wall of the fuel tank. Thus the pump and the reserve tank can be combined to form a single unit which can be fixed to the bottom of the tank with one more elastic intermediate layers to prevent sound transmission from the pump to the tank.

For a better understanding of the present invention, together with other and further objects, reference is made to the following description, taken in conjunction with the accompanying drawing, and its scope will be pointed out in the appended claims.

BRIEF DESCRIPTION OF THE DRAWING

The drawing shows a cross-sectional view of a fuel tank in accordance with the present invention.

DESCRIPTION OF THE INVENTION

Referring to the drawing, there is shown a partial cross-sectional view of a fuel tank which includes a tank enclosure 3 formed of lower and upper half-shells 1 and 2 respectively. The bottom wall 4 of tank enclosure 3 includes a recess 5 to which is mounted a reserve tank 12, which includes a fuel pump 8, as will be further described.

The top wall 6 of the enclosure 3 includes an opening 7 which is arranged opposite recess 5. Opening 7 has a sufficiently large diameter so that fuel pump 8 can be inserted or removed through the openings for purposes of repair. Opening 7 is closed by cover 9, which in the embodiment illustrated, is arranged with engagement member 10 for one-turn screw closing, so that the cover 9 must be turned for opening or closing of the opening 7.

Reserve tank 12 is joined to the bottom 4 of enclosure 3 in the region of recess 5 with the interposition of intermediate elastic ring 11. Reserve tank 12 is provided with inlet ports for fuel in the customary manner and serves to insure a supply of fluid in the region of the intake opening of pump 8. Thus the region surrounding filter screen 13, has a supply of fuel even when the vehicle travels around corners or turns, and the fuel level in the tank is relatively low. In the embodiment illustrated, the reserve tank 12, with its inwardly turned mounting member 14, serves as a bracket for fuel pump 8. A cylindrical intermediate layer 15, fabricated of resilient material, is provided between member 14 and fuel pump 8 in order to avoid noise transmission from the fuel pump to the fuel tank. Naturally, the material of the resilient member 15 must be selected to be resistent to breakdown by the fluids in the fuel tank.

In accordance with the arrangement illustrated, no additional elements are required to support the fuel pump 8, so that the interior volume of tank 3 can be largely used to store fuel and very little volume is taken up by the presence of fuel pump 8 and its mounting brackets. The mounting of pump 8 is largely achieved by the use of the reserve tank 12, which must be provided in the tank in any event.

As illustrated in the cross-sectional view of the drawing, outlet fuel line 17 has a connection 20 which is horizontal in the tank and outlet 16 of fuel pump 8 has a connection 19 which is also horizontal. A flexible hose is provided to extend between connection 19 and connection 20 in a helical path illustrated by line 18. The length of the flexible tube is sufficient to allow not only relative movement between pump 18 and cover 9, such as are necessary for opening and closing the cover 9, but also the possibility of relatively large differences in height, as between various size gas tanks. The curved path 18 which the flexible fuel line follows between pump 8 and cover 9 is approximately a full circle when viewed from the direction of the top wall of the tank enclosure. The use of this over-dimensioned fuel line, which follows a circular arc in the tank, enables the use of a one-turn cover 9 to close the opening 7 in the fuel tank top wall. Electric lines 21 and 22, which lead to the pump 8 from the cover 9, are likewise over-dimensioned in length to allow opening of the cover, and might also be arranged to follow the curved circular path 18 which is taken by the flexible fuel line.

While there has been described what is believed to be the preferred embodiment of the invention, those skilled in the art will recognize that other and further modifications may be made thereto without departing from the spirit of the invention, and it is intended to claim all such embodiments as fall within the true scope of the invention.

We claim:

1. A vehicle fuel tank comprising a tank enclosure having a bottom wall and a top wall, both connected by sidewalls, an opening on the top wall, and a cover for closing said opening, a fuel pump, a reserve tank within said fuel tank, comprising a vertically extending wall surrounding an enclosed space and provided with an inlet port for fuel contained in said tank, and a flexible fuel outlet line extending in a curved path between said pump and said cover, wherein said pump is within said enclosed space and surrounded by, and mounted to said reserve tank wall by use of a noise dampening intermediate member and said reserve tank is mounted to said bottom, wherein said vertically extending wall comprises a cylindrical wall, and wherein said cylindrical wall has an upper portion forming a mounting member configured to receive and support said fuel pump, and wherein said fuel pump is cylindrical and is surrounded by a cylindrical intermediate layer of resilient material, forming said intermediate noise dampening member, and wherein said fuel pump and said intermediate layer are inserted into said mounting member.

2. A fuel tank as specified in claim 1 wherein said cover and said pump are provided with fuel line connections arranged to receive a horizontal fuel line, and wherein said curved path comprises approximately a helical arc between said connections when viewed from the direction of said top wall.

3. A fuel tank as specified in claim 1 or 2 wherein there are provided electrical connection lines for said pump, said lines extending in a curved path between said cover and said pump.

4. A vehicle fuel tank as specified in claim 1 wherein said bottom wall includes a recess for receiving said reserve tank, and wherein said reserve tank is mounted to said recess by the interposition of an elastic ring.

5. A vehicle fuel tank as specified in claim 1 wherein said vertically extending wall comprises a cylindrical wall, and wherein said cylindrical wall is turned inward thereby to form a mounting member for receiving said fuel pump, and wherein said fuel pump is cylindrical and is surrounded by a cylindrical intermediate layer of resilient material, forming said intermediate noise dampening member, and wherein said fuel pump and said intermediate layer are inserted into said inwardly turned mounting member.

6. A vehicle fuel tank as specified in claim 1 wherein said noise dampening intermediate member surrounds the fuel pump at an upper section, spaced from said tank bottom, and engages an upper portion of said vertically extending wall of said reserve tank thereby to provide a reserve fuel space surrounding the lower portion of said fuel pump.

* * * * *

UNITED STATES PATENT AND TRADEMARK OFFICE
CERTIFICATE OF CORRECTION

PATENT NO. : 4,306,844
DATED : December 22, 1981
INVENTOR(S) : Otto et al.

It is certified that error appears in the above—identified patent and that said Letters Patent is hereby corrected as shown below:

Column 1, line 35, "provide" should read --provided--;
Column 2, lines 24-25, "movments" should read --movements--;
Column 3, line 38, after "closing" insert --of--;
Column 4, cancel claim 5 and substitute therefor: --5. A vehicle fuel tank as specified in claim 1 wherein said cylindrical wall is turned inward thereby to form said mounting member--.

Signed and Sealed this

Eleventh Day of May 1982

[SEAL]

Attest:

*Attesting Officer*

GERALD J. MOSSINGHOFF

*Commissioner of Patents and Trademarks*